United States Patent
Lamparter et al.

(10) Patent No.: US 11,175,643 B2
(45) Date of Patent: Nov. 16, 2021

(54) RICH CONTEXTUALIZATION OF AUTOMATION DATA

(71) Applicant: Siemens Aktiengesellschaft, Munich (DE)

(72) Inventors: Steffen Lamparter, Feldkirchen (DE); Stephan Grimm, Munich (DE); Lingyun Wang, Princeton, NJ (US); Justinian Rosca, West Windsor, NJ (US); George Lo, Langhorne, PA (US)

(73) Assignee: Siemens Aktiengesellschaft, Munich (DE)

( * ) Notice: Subject to any disclaimer, the term of this patent is extended or adjusted under 35 U.S.C. 154(b) by 659 days.

(21) Appl. No.: 15/749,640

(22) PCT Filed: Aug. 11, 2015

(86) PCT No.: PCT/US2015/044554
§ 371 (c)(1),
(2) Date: Feb. 1, 2018

(87) PCT Pub. No.: WO2017/027012
PCT Pub. Date: Feb. 16, 2017

(65) Prior Publication Data
US 2018/0224821 A1    Aug. 9, 2018

(51) Int. Cl.
*G05B 19/05* (2006.01)
*G06F 40/30* (2020.01)

(52) U.S. Cl.
CPC .......... *G05B 19/054* (2013.01); *G05B 19/05* (2013.01); *G05B 2219/1105* (2013.01);
(Continued)

(58) Field of Classification Search
CPC .. G06F 16/36; G06F 16/367; G06F 17/30734; G06F 19/28; G06F 19/709;
(Continued)

(56) References Cited

U.S. PATENT DOCUMENTS

2003/0204560 A1* 10/2003 Chen ................. H04L 29/06
                                                709/203
2007/0142941 A1   6/2007 McGreevy et al.
(Continued)

OTHER PUBLICATIONS

Stokic et al., "Generic self-learning context sensitive solution for adaptive manufacturing and decision making systems", 2014, Proceedings of the ICONS14—The Ninth International Conference on Systems, Nice, France, pp. 73-78.*
(Continued)

*Primary Examiner* — Juan C Ochoa

(57) ABSTRACT

A method of operating an intelligent programmable logic controller (PLC) as part of a production process within an automation system includes the intelligent PLC receiving automation system data and a semantic context model comprising a plurality of ontologies providing formal specifications of conceptual entities associated with the automation system. The intelligent PLC creates one or more semantic annotations for the automation system data using the semantic context model. These semantic annotations are stored along with the automation system data in a non-volatile storage medium included in the intelligent PLC.

13 Claims, 10 Drawing Sheets

(52) U.S. Cl.
CPC .............. *G05B 2219/13047* (2013.01); *G05B 2219/13111* (2013.01); *G05B 2219/13144* (2013.01); *G06F 40/30* (2020.01); *Y02P 90/02* (2015.11); *Y02P 90/80* (2015.11)

(58) Field of Classification Search
CPC ....... G06F 40/30; G16B 50/10; G05B 19/054; G05B 19/05; G05B 2219/13047; G05B 2219/1105; G05B 2219/13111; G05B 2219/13144; Y02P 90/265; Y02P 90/86; Y02P 90/02; Y02P 90/80
USPC .................................................. 703/13, 4, 7
See application file for complete search history.

(56) References Cited

U.S. PATENT DOCUMENTS

| | | | | |
|---|---|---|---|---|
| 2007/0245297 | A1* | 10/2007 | Kuester | G06F 8/10 717/104 |
| 2009/0089232 | A1 | 4/2009 | Baier et al. | |
| 2011/0153311 | A1* | 6/2011 | Bogl | G06Q 10/06 704/9 |
| 2013/0085587 | A1* | 4/2013 | Gentile | G06Q 50/04 700/95 |
| 2013/0211546 | A1 | 8/2013 | Lawson et al. | |
| 2013/0297548 | A1* | 11/2013 | Cescolini | G06N 5/00 706/46 |
| 2017/0048122 | A1* | 2/2017 | Kerschbaum | H04L 43/12 |
| 2017/0316061 | A1* | 11/2017 | Hubauer | G06F 16/24575 |

OTHER PUBLICATIONS

Stokic et al., "Context sensitive Web service engineering environment for product extensions in manufacturing industry", Mar. 2015, The Seventh International Conferences on Advanced Service Computing, pp. 9-13.*

Abele et al., "Resource monitoring in industrial production with knowledge-based models and rules", 2011, Proceedings of the 4th workshop on Workshop for Ph. D. students in information & knowledge management, pp. 35-42.*

Stokic et al., "Self-learning embedded services for integration of complex, flexible production systems", 2011, IECON 37th Annual Conference of the IEEE Industrial Electronics Society, pp. 415-420.*

Aitor Murguzur Ibarguren, Dynamic variability support in context-aware workflow-based systems, 2015, Diss. Mondragon Unibertsitatea, pp. 1-131.*

Juha Puttonen, "A Semantically Enhanced Approach for Orchestration of Web Services in Factory Automation Systems", 2014, pp. 1-157.*

Legat et al., "Automatic generation of field control strategies for supporting (re-) engineering of manufacturing systems", 2014, Journal of Intelligent Manufacturing 25.5, pp. 1101-1111.*

International Search Report dated Dec. 21, 2015; Application No. PCT/US2015/044554; Filing Date: Aug. 11, 2015; 10 pages.

* cited by examiner

RICH CONTEXTUALIZATION OF AUTOMATION DATA

This application is a national phase filing under 35 U.S.C. § 371 of International Patent Application No. PCT/US2015/044554, filed Aug. 11, 2015, which is incorporated herein by reference in its entirety.

TECHNICAL FIELD

The present invention relates generally to the use of a programmable logic controller which includes functionality for contextualizing automation data. The disclosed technology may be applied to, for example, various automated production environments where programmable controllers are used.

BACKGROUND

A programmable logic controller (PLC) is a specialized computer control system configured to execute software which continuously gathers data on the state of input devices to control the state of output devices. A PLC typically includes three major components: a processor (which may include volatile memory), volatile memory comprising an application program, and one or more input/output (I/O) ports for connecting to other devices in the automation system. PLCs are utilized in various industrial settings to control automation systems.

In automation environments, PLCs play the role of low-level control units that monitor and steer the devices of industrial facilities, while on upper levels process data is being aggregated and analyzed for overall planning, scheduling and reporting. Currently, the field device data that is communicated from PLCs to upper level systems, such as Supervisory Control and Data Acquisition (SCADA) or Manufacturing Execution Systems (MES), lacks information about the context in which it has been recorded at operation time. Sensor signals like motor temperature, for example, are communicated through field bus messages or Open Platform Communications (OPC) variables in form of plain numbers without additional information about complex data types, relations to other objects like the motor for which the temperature is being measured or further context about their surrounding environment. This results in situations where the actual meaning of some integer value coming from a PLC is not transparent for analytical applications on top of low-level control. Even in cases where context is given through deployment information and control program structures within a PLC, this information is getting lost along the currently established field communication paths and has to be tediously reconstructed. In consequence, field device data coming from PLCs are hard to interpret for further analytical processing (e.g., manufacturing intelligence applications). The result is a tight coupling between the development of low-level control programs and upper level analytical applications restricting flexibility and adaptability of the system, e.g., if the system changes (e.g., sensor is replaced), also the analytical application has to be updated.

In conventional systems, context about process, machinery, or product information is reconstructed at higher levels of automation systems, which is tedious, error-prone and goes along with loss of contextual information compared to the early capturing of context in field devices. While semantic contextualization of data by smart automation systems has been proposed previously, the use of rich context models covering several different dimensions of the system has not been addressed. In particular, the use of information that is generated not directly from the controlled system, but acquired from the micro-environment (e.g., temperature within the plant) or macro-environment (e.g., energy prices) has not been considered. To support rich contextualization, a context model management architecture is desired that provides tools and interfaces for bootstrapping, editing, and deployment of context models.

SUMMARY

Embodiments of the present invention address and overcome one or more of the above shortcomings and drawbacks by providing methods, systems, and apparatuses related to a contextualizing automation data using an overarching and modularized context model that allows for an integrated representation of semantic annotations. Through this model, all the various aspects of context can be captured and interlinked in a flexible way. The techniques described herein use of semantic technologies to enable flexible and dynamic modularization and model integration. Moreover, in various embodiments described herein, the context model may be embedded into control level devices.

According to some embodiments, a method of operating an intelligent programmable logic controller (PLC) as part of a production process within an automation system includes the intelligent PLC receiving automation system data and a semantic context model comprising a plurality of ontologies providing formal specifications of conceptual entities associated with the automation system. The intelligent PLC creates one or more semantic annotations for the automation system data using the semantic context model. These semantic annotations are stored along with the automation system data in a non-volatile storage medium included in the intelligent PLC. In some embodiments, the method further includes the intelligent PLC detecting an event occurring within the automation system and applying one or more analytical models to the one or more semantic annotations and the automation system data to determine contextual information associated with the event.

Various types of ontologies may be used in the aforementioned method. For example, in some embodiments, the ontologies comprise an asset ontology comprising plant topology information associated with the automation system. The ontologies may also include ontologies which include information associated with resource flow through the production process; information associated with a product produced by the production process; information associated with events related to operation of the automation system; information related to scheduled downtime of one or more components of the automation system; and/or information associated with program logic executed by control layer devices within the automation system.

In one embodiment, the ontologies used in the aforementioned method include a formal specification of entities producing environmental data. This formal specification may include, for example, information corresponding to one or more environmental data sources external to the automation system (e.g., remote webservers).

According to other embodiments of the present invention, a context model manager computer is configured to generate a semantic context model representative of an automation system. The context model manager computer includes a model import component, a management services component, and a model export component. The model import component is configured to import automation system knowledge from at least one of an automation engineering system and an automation runtime system. The management services component is configured to identify conceptual entities associated with the automation system based on the automation system knowledge, and generate the semantic context model comprising a plurality of ontologies providing formal specifications of the conceptual entities associated with the automation system. The model export component is configured to deploy the semantic context model to one or more intelligent PLCs in the automation system.

In some embodiments, the aforementioned context model manager further includes a model editor component configured to receive one or more user modifications to the semantic context model. The management services component may then be configured to modify the semantic context model based on the one or more user modifications. In one embodiment, the model editor component is further configured to present a graphical user interface which displays the semantic context model and receives the one or more user modifications to the semantic context model.

In some embodiments of the aforementioned context model manager, the automation system knowledge is provided in distinct context models and the management services component is further configured to formally and semantically align the plurality of distinct context models to yield the semantic context model. The distinct context models may be specified in a plurality of data formats and the management services component may be further configured to translate the plurality of distinct context models into a common semantic language (e.g., the OWL/RDF or OPC-UA standard).

According to other embodiments of the present invention, an intelligent programmable logic controller includes one or more processors configured to execute according to a scan cycle, a volatile computer-readable storage medium comprising a process image area storing automation system data, a non-volatile computer-readable storage medium, and a plurality of controller components executed by the one or more processors according to the scan cycle. The plurality of controller components comprises a data connector component, a contextualization component, and a historian component. The data connector component includes a deployment interface configured to receive a semantic context model comprising ontologies providing formal specifications of conceptual entities associated with an automation system in which the intelligent programmable logic controller is operating. The contextualization component is configured to create one or more semantic annotations for the automation system data using the semantic context model. The historian component is configured to store, in a non-volatile storage medium included in the intelligent programmable logic controller, the one or more semantic annotations and the automation system data. In some embodiments, the controller components further comprise a data analytics component configured to apply one or more analytical models to the one or more semantic annotations and the automation system data to determine contextual information associated with automation events.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION

Figure 1:
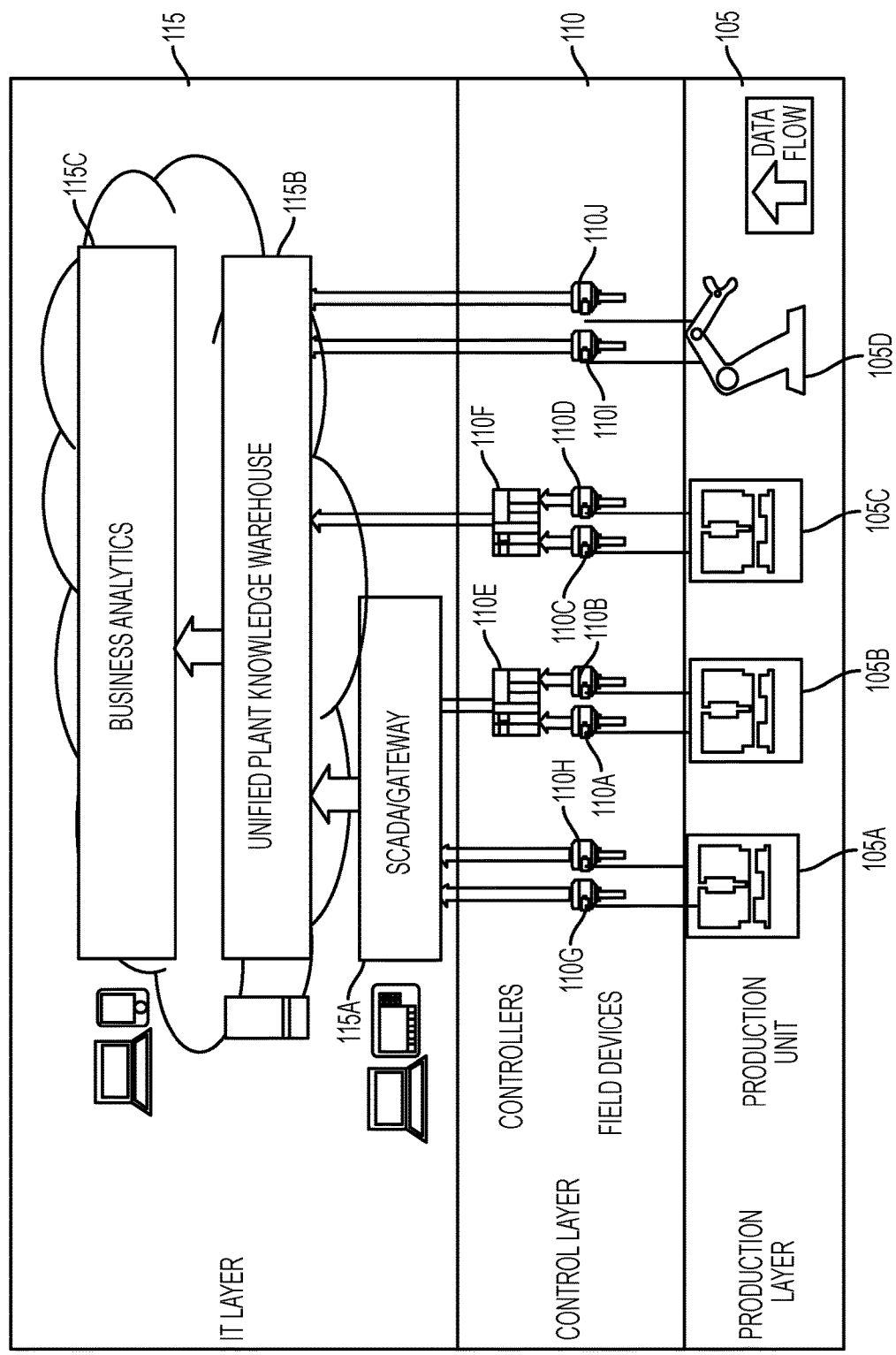
FIG. 1 provides a system view of an Intelligent PLC integrated into an automation system, according to some embodiments of the present invention.

Systems, methods, and apparatuses are described herein which relate generally to an Intelligent PLC (described below) which includes functionality for rich contextualization of automation system data. More specifically, the technology described herein introduces a contextualization component in the communication field device data that resides, for example, inside a PLC or on top of several PLCs to augment plain data with conceptual semantic annotations according to context models. The interplay of these different elements is as follows: context models define the vocabulary, conceptual entities and their relations that are used for creating semantic annotations, and serve as a parameterization of the computational behavior within the contextualization layer. While, at design time, context models may describe the static aspects of the environment in which a PLC is embedded, at operation time semantic annotations may be dynamically generated within the contextualization layer to link any data item communicated to upper layers to one or more elements in the context models for their contextual enrichment. Furthermore, formal reasoning can yield additional metadata that can be further used in contextualization. Although in detail, the context models may be application-specific and differ from case to case, a stable upper structure is described herein for applying a set of context models that cover different aspects of contextualization under an overall umbrella.

Various embodiments of the present invention are described in the context of a PLC which includes various components configured to provide an assortment of enhanced functions in control applications. This PLC, referred to herein as an "Intelligent PLC," is described in greater detail in U.S. Pat. No. 9,946,244 entitled "Intelligent Programmable Logic Controller," the entirety of which is incorporated herein by reference. Briefly, the Intelligent PLC offers several technical features which may be present in various combinations and used in different embodiments of the present invention. The Intelligent PLC provides efficient data storage on control layer devices. More specifically, functionality of the control layer may be extended by an efficient storage mechanism for time series data (i.e., a "historian" function) which allows short-/mid-term archiving of high resolution time-stamped data. With high fidelity data, no events are lost. Efficient compression algorithms (e.g., a variation of swinging door) may be used to reduce storage and communication demands. The Intelligent PLC may also offer an intelligent on-device data generation method in some embodiments. Methods for data filtering may be applied directly where data is generated to ensure that additional data is only stored if it provides additional information content. These methods may also actively analyze incoming data and configure data acquisition according to the current needs, for example, by adjusting the sample rate or by storing data only if certain events have been detected. The Intelligent PLC may also enable rich and semantic contextualization, and perform control layer semantic analytics. Additionally, in some embodiments, the Intelligent PLC also provides distributed analytics across automation systems.

FIG. 1 provides a system view of an Intelligent PLC integrated into an automation system 100, according to some embodiments of the present invention. This example conceptually partitions the industrial environment into a Production Layer 105, a Control Layer 110, and an IT Layer 115. In conventional systems, most data handling functions are performed at the IT Layer 115. Using the Intelligent PLCs 110E and 110F, the system 100 illustrated in FIG. 1 pushes many of these data handling functions down to the Control Layer 110. For example, in some embodiments, historian capabilities such as efficient data compression for time-series data and intelligent filtering of data may be implemented directly on the Intelligent PLCs 110E and 110F. This allows the Control Layer 110 to utilize high-fidelity data with less storage/communication effort such that few, if any, events go undetected. In some embodiments, the Intelligent PLCs 110E and 110F also provide rich contextualization functionality. By adding control level knowledge to data, it may not be necessary to re-discover knowledge on Business Analytics 115C at the IT Layer 115. Additionally, in some embodiments, the Intelligent PLCs 110E and 110F provide data analytics functionality directly on their respective device, thus increasing machine and process efficiency.

Continuing with reference to FIG. 1, at the Production Layer 105, one or more production units (e.g., Unit 105A) operate. Each production unit sends and receives data through one or more field devices (e.g., Field Device 110A) at the Control Layer 110. At the Control Layer 110, each field device may be connected to an Intelligent PLC (e.g., Intelligent PLC 110E). Data received from the production units is transferred (either directly by the field devices or via an Intelligent PLC) to the IT Layer 115. The IT Layer 115 includes systems which perform various post-processing and storage tasks. The example of FIG. 1 includes a Supervisory Control and Data Acquisition (SCADA) Server (or Gateway) Component 115A. This Component 115A allows an operator to remotely monitor and control the devices at the Control Layer 110 and Production Layer 105. Additionally, the SCADA Server Component 115A collects data from the lower layers 105, 110 and processes the information to make it available to the Unified Plant Knowledge Warehouse 115B. The Unified Plant Knowledge Warehouse 115B provides further processing and storage of the data received from the lower layers 105, 110. Various functionality may be provided by the Unified Plant Knowledge Warehouse 115B. For example, in some embodiments, the Unified Plant Knowledge Warehouse 115B includes functionality for generating analytics based on the data generated by the lower layers 105, 110.

Each Intelligent PLC 110E and 110F includes three basic portions: a processor, a non-transitory, non-volatile memory system, and a data connector providing input/output functionality. The non-volatile memory system may take many forms including, for example, a removable memory card or flash drive. Applications that may execute within the Intelligent PLCs 110E and 110F are described in greater detail below with reference to FIG. 2. The data connector of Intelligent PLC 110E is connected (wired or wirelessly) to Field Devices 110A and 110B. Similarly, the data connector of Intelligent PLC 110F is connected to Field Devices 110C and 110D. Any field device known in the art may be used with the Intelligent PLC described herein. Examples of field devices that may be used with the Intelligent PLC include, without limitation, pressure switches, sensors, push buttons, flow switches, and level switches. Note that the Intelligent PLCs 110E and 110F may be integrated into the production environment piecemeal. For example, in FIG. 1, Production Units 105B and 105C are connected through their respective field devices to Intelligent PLCs 110E and 110F, while Production Units 105A and 105D communicate directly through their respective Field Devices 110G, 110H, 110I, 110J to the Unified Plant Knowledge Warehouse 115B.

The Intelligent PLCs 110E and 110F may enrich data using additional context dimensions compared to state of the art systems (e.g., control knowledge, environmental conditions, and service incidences). This allows insights to be made from data analytics with higher confidence and quality. In some embodiments, the system 100 uses semantic data representation languages and standards for contextualization of data in automation systems. This allows business analytics as well as SCADA-level historians (e.g., OSI PI asset framework) to be configured with minimal effort for integration with data from other systems/devices/sources. Also the system 100 may provide model-based semantic analytics at the Control Layer 110. Thus, analytical algorithms can be updated during device runtime and root cause analysis can be improved by providing explicit access to models (instead of compiled logic in a function block). In some embodiments, the system 100 introduces a distributed data sharing system in the Control Layer 110 and integrates with external Big Data infrastructures. Thus, applications can access all required data independent from storage location.

Figure 2:
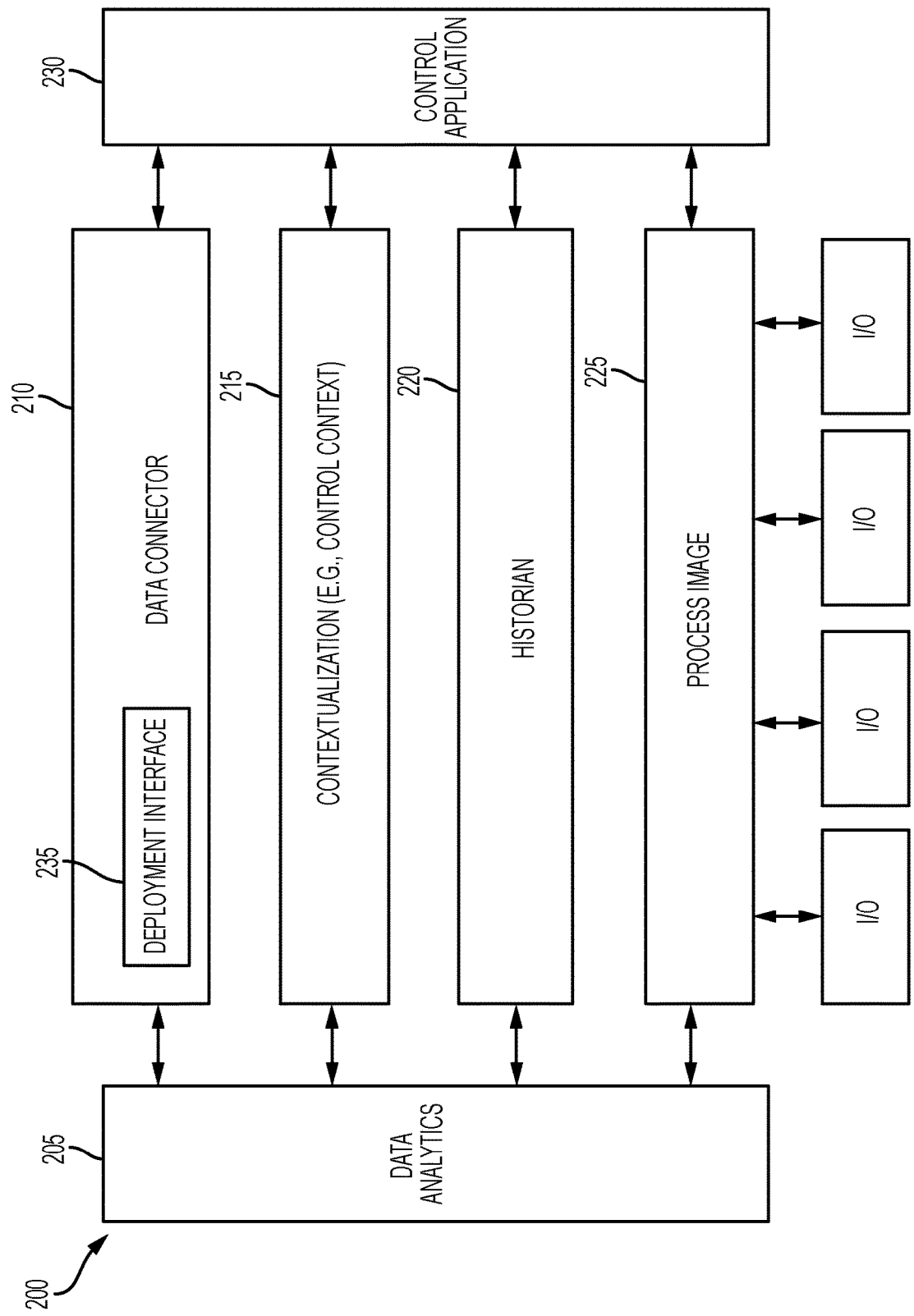
FIG. 2 provides an illustration of the system components included in an Intelligent PLC which may be used to generate and process contextualized automation, according to some embodiments of the present invention.

FIG. 2 provides an illustration of the system components included in an Intelligent PLC 200 which may be used to generate and process contextualized automation, according to some embodiments of the present invention. Process Image Component 225 is a memory area in a controller's CPU volatile system memory which is updated in each processing/scan cycle based on data associated with the production devices (e.g., the inputs and outputs of connected I/Os). In each processing step, the Control Application 230 reads the Process Image Component 225, executes deployed application logic, and writes results back into the Process Image Component 225. The Process Image Component 225 may include various system events and alarms that are used in conventional automation systems. These system events and alarms are manually programmed during the engineering phase and cannot be modified without decommissioning the automation project.

Continuing with reference to FIG. 2, the process image of each cycle is read and permanently stored on a non-volatile physical storage medium by the Historian Component 220. In some embodiments, this Historian Component 220 is configured to deploy data compression algorithms to reduce data volume. It thereby can provide applications with access to past process images. Data may be stored either for a fixed time window or online algorithms are used to realize dynamic caching heuristics. As part of the Historian Component 220, intelligent data generation algorithms may continuously analyze the process image and context to adjust data generation parameters (e.g., sampling rate) of connected I/Os. For example, for fast changing sensor signals, a high sampling rate may be selected while for slowly changing sensor signals a lower sampling rate is sufficient.

The Data Analytics Component 205 comprises a set of data analysis algorithms that process the current or past process images (queried from the historian). Various data analysis algorithms may be included in the Data Analytics Component 205. For example, in some embodiments, these algorithms include one or more of clustering, classification, logic-based reasoning, and statistical analysis algorithms. Moreover, algorithms may be specified via a model which can be deployed during runtime on the device. The Data Analytics Component 205 may also include various analytical models and dedicated algorithms to interpret these models. The results generated by the Data Analytics Component 205 may be stored in the Historian Component 220, written back to the Process Image Component 225 and/or provided to external components via the Data Connector Component 210. Thus, the Intelligent PLC may be viewed as a device for providing distributed analytics to the other devices in the automation system.

A Contextualization Component 215 annotates incoming data with context information to facilitate its later interpretation. Context information, as used herein, may include any information that describes the meaning of data. In terms of automation systems, context reflects information about the current situation that denotes the frame of the system's operation, comprising several distinguished views, reaching from high-level automation process description down to individual sensor specifications. Conventional PLCs are not able to capture this holistic information, which negatively affects the capability to reason about state, e.g., deduct new facts from given data and metadata, and the accuracy and insights of analytics at all automation levels. The context information may be stored (e.g., by the Historian 220) and used in analytics processing by the Data Analytics Component 205. Additionally (or alternatively), context data may be shared with other devices in the automation system. For example, whenever a value of an externally visible PLC variable (e.g., via OPC or bus systems) is transmitted to an upper automation layer, a semantic annotation may be created and is transmitted alongside.

For example, context of data gathered and utilized by the Contextualization Component 215 may include information about the device that generated the data (e.g., a sensor), about the structure of the automation system (e.g., topology of a plant), about the working mode of the system (e.g., downtime event), about the automation software and its status while the data was generated, and/or about the product/batch that was produced while the data was generated. The Contextualization Component is configured to provide data to any of the other components for more specific processing needs. The context information generated by the Contextualization Component 215 may not be restricted to the asset structure but may also include control knowledge, product-specific information, process information, event information, and potentially other aspects such external events like weather information. Some context information may be imported from engineering tools (e.g., Siemens Totally Integrated Automation tools).

In some embodiments, the Contextualization Component 215 provides semantic contextualization wherein the Contextualization Component 215 utilizes context models in order to act as consistent knowledge base at PLC level. These context models may be represented using semantic information models (i.e., ontologies) which are explicit formal specifications of the notions (concepts) in a domain and the relations among them. Ontologies augment information with meaning and enable machines to reason and infer new facts from them. The context may be represented by a standard modeling language (e.g., Web Ontology Language, Resource Description Framework) where the meaning of the language constructs is formally defined. Contextualization of data with these semantic modeling standards enables business analytics applications to automatically understand and interpret the data provided from the automation system without manual configuration effort.

The additional semantic annotations produced by the Contextualization Component 215 comprise structural metadata that link the values of PLC variables to elements in the context models, giving them meaning in terms of relations to concepts in ontologies. For a particular variable there can be multiple links to different parts of context. These links serve as an entry point into the static structure of the context ontologies that can then be navigated at run time to acquire even more context for a PLC signal and its surrounding environment. As a technology, RDF may be used to represent semantic annotations, adding only structural links into ontologies that are shared among several PLCs or contextualization layers. The use of semantic models for describing content information is described in greater detail in PCT Patent Application No. PCT/US14/66137 entitled "Semantic Contextualization in a Programmable Logic Controller," the entirety of which is incorporated herein by reference.

Using the functionality of the Data Analytics Component 205 and the Contextualization Component 215 described herein, the scope of analysis and optimization may be expanded to cover the production processes themselves and is not limited to the Intelligent PLC itself or the area of the directly controlled devices. For example, the focus of analytics on the Intelligent PLC may not only be to ensure the functioning of the Intelligent PLC and its connected sensors and actuators (e.g., hardware-specific enhanced events) but also to optimize the controlled production process in a larger context (e.g., based on knowledge of the application domain and infrastructure).

Any data captured or generated by the components of Intelligent PLC 200 may be provided to external components via a Data Connector Component 210. In some embodiments, the Data Connector Component 210 delivers data via a push methodology (i.e., actively sending to external component). In other embodiments, a pull methodology may be used where data is queried by external component). Additionally, push and pull methodologies may be combined in some embodiments such that the Intelligent PLC is configured to handle both forms of data transfer.

Deployment Interface 235 is a module included as part of the Data Connector Component 210. The Deployment Interface 235 provides access to the knowledge and data management functionality of the system 200 in order to read and write imperative or declarative knowledge, as well as data. The Deployment Interface 235 may utilize communication protocols and standards such as, for example, OPC, HTTP, REST, STEP7, TCP/IP, etc.

Figure 3:
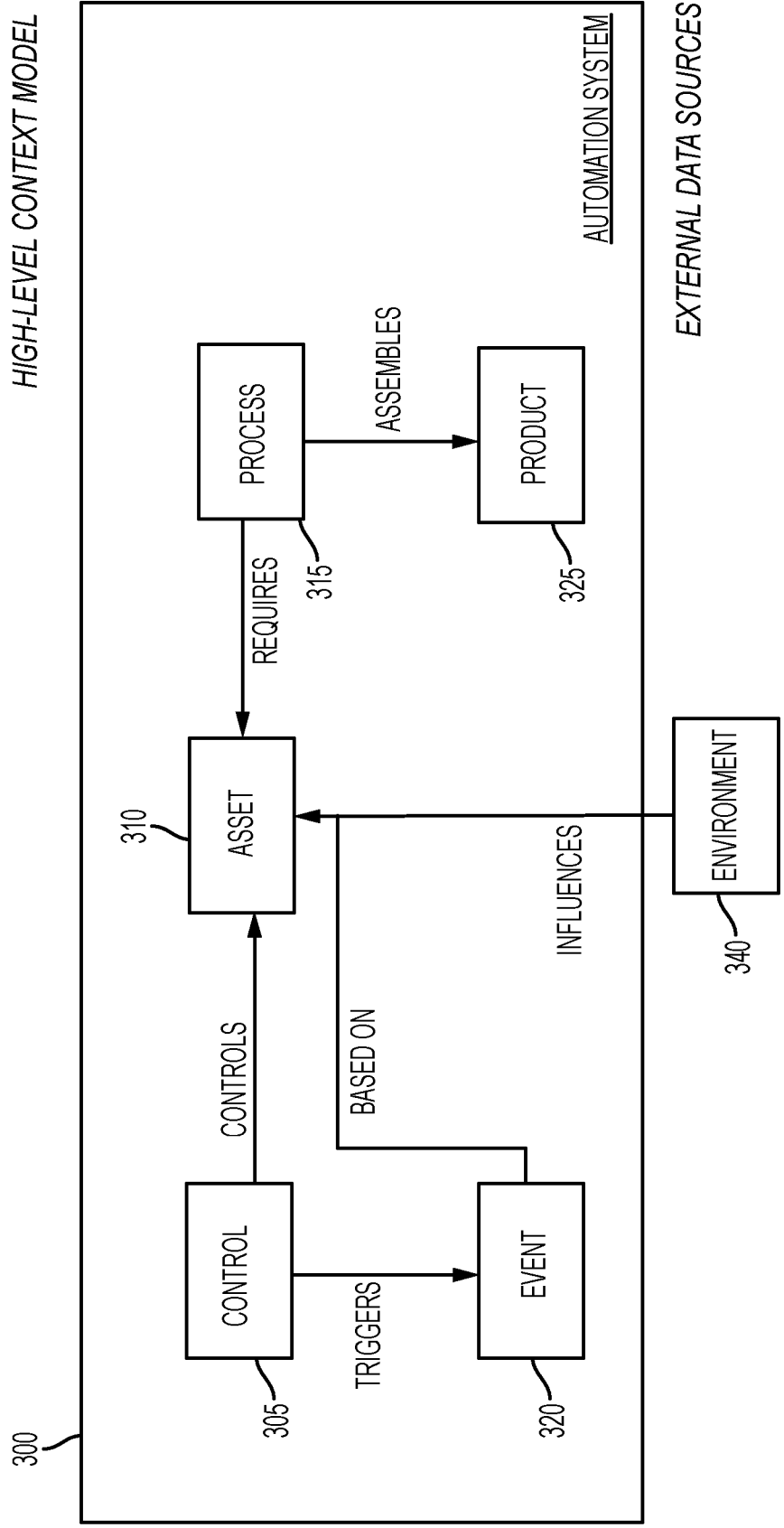
FIG. 3 includes an upper ontology that serves as an umbrella to include specific ontologies covering the most important aspects of context for field devices in an automation environment, according to some embodiments.

FIG. 3 shows a high-level context model 300 that may be employed to represent the various ontologies utilized by the Contextualization Component of the Intelligent PLC in different embodiments of the present invention. The feature of modularity of ontologies allows for the inclusion of any particular background knowledge in form of problem-specific or domain-specific ontologies that can be linked to other context ontologies that are included in the contextualization layer. Context can be organized in different dimensions, representing different logical views on the automation/production process. The example shown in FIG. 3 includes an upper ontology that serves as an umbrella to include specific ontologies covering the most important aspects of context for field devices in an automation environment.

In FIG. 3, Asset Context 310 comprises information about the plant topology (i.e., plant components and their structure) such as machines and connected pipelines. Process Context 315 includes information about the flow of resources through the entire production process (e.g., consecutive steps of an assembly line). Product Context 325 comprises information about the manufactured product itself (e.g., materials and quality structure). Event Context 320 contains information about certain events that influence the working mode of the automation system, including service and maintenance (e.g., scheduled downtime events, device replacements). Control Logic Context 305 represents information about programs, data and parameters of control layer devices that can be inferred from their program logic (e.g., what kind of data is generated by a particular sensor).

Continuing with reference to FIG. 3, Environmental Condition Context 340 is used to represent environmental conditions of the production plant (e.g., temperature and humidity). This includes information about the "micro-environment" such as room humidity and temperature that may cause asset failure and about the "macro-environment" such as energy pricing which may be used to optimize the production against cost. The Environmental Condition Context 340 comprises conditions of the automation systems environment, including, without limitation, weather data, work area environment data (e.g., humidity, temperature, air pressure, noise, etc.), unexpected events (e.g., power-outage, power reset, etc.), maintenance events, schedule changes, energy price information, and/or operator information. Usually environmental conditions cannot be controlled by the automation system; however, they may affect working modes of assets and explain or predict previously unknown failures.

Environmental Condition Context 340 may be gathered from any of a variety of external sources. These external sources may be physical sensors directly or indirectly connected to the Intelligent PLC. Alternatively (or additionally) the external sources can be data streams provide by external computing services. Examples of such external sources include temperature sensors, humidity sensors, service reports, weather data streams, energy marketplaces, or logistic tracking data streams. In some embodiments, external data is retrieved and processed automatically by the Intelligent PLC. In other embodiments, a manual method of providing context data by operators should be provided. For example, information about a recent power outage shall be possible to enter into the system. Such external context data will be used to contextualize the new data and events generated out of automation system.

FIG. 3 shows that the external environment is not controlled by, but can influence, the automation system. For example, the environment can influence assets (e.g., high humidity affects sensors) and can also influence the control (e.g., fault detection) and process (e.g., high electricity price alters the schedule). The external environment may even trigger events inside automation system. The Intelligent PLC may model the external environment and utilize the online environmental data to contextualize the real-time automation data. This will provide additional insights to the production process. Analytical models that use environment contexts and data can also be generated. For example, with the Environmental Condition Context 340, the Intelligent PLC may monitor humidity and generate an event and associates the event to the asset photo eye sensor. If a sensor error is generated later, a potentially cause-by relationship can be generated between these two events.

Bits and pieces of the required context-specific knowledge about automation systems are already present within conventional engineering and runtime tools. While knowledge about asset topology, product genealogy, or bill of process is explicitly accessible, control knowledge may be implicitly encoded into control programs and more sophisticated annotation/extraction algorithms for their contextualization have to be developed. For example, Siemens' Totally Integrated Automation (TIA) Portal is an example of an Automation Engineering Tool 425 that provides capabilities for design and engineering of complex automation control systems. The TIA Portal offers capabilities to design and build control systems elements, from the topology specification (e.g., hardware configuration) to the control programs in several programming languages such as Ladder (LAD), Statement List (STL), Structured Control Language (SCL), Function Block Diagram (FBD), S7-GRAPH, including control variable definition and the capability to setup and tune PID controllers. The following knowledge about the control system manipulated during the design and engineering phase is maintained in a TIA project: connectivity between devices; sensors and actuators, inputs and outputs for devices and device connectivity; functions, function blocks, organization blocks, programs, processes, and logical relationships amongst them; variable names and address assignment of variables to specific programs and processes on one side and devices on the other side; data types and variable types (e.g., global, direct, I/O, external, temporary, time etc.); and explanation and justification of control logic, control loops, control structure in the control program in form of comments and notes; and auxiliary code used for testing, observing, tracing, and debugging. All of this information may be utilized in the creation of a semantic model which provides a detailed representation of the automation system, as described below with respect to FIG. 4.

Figure 4:
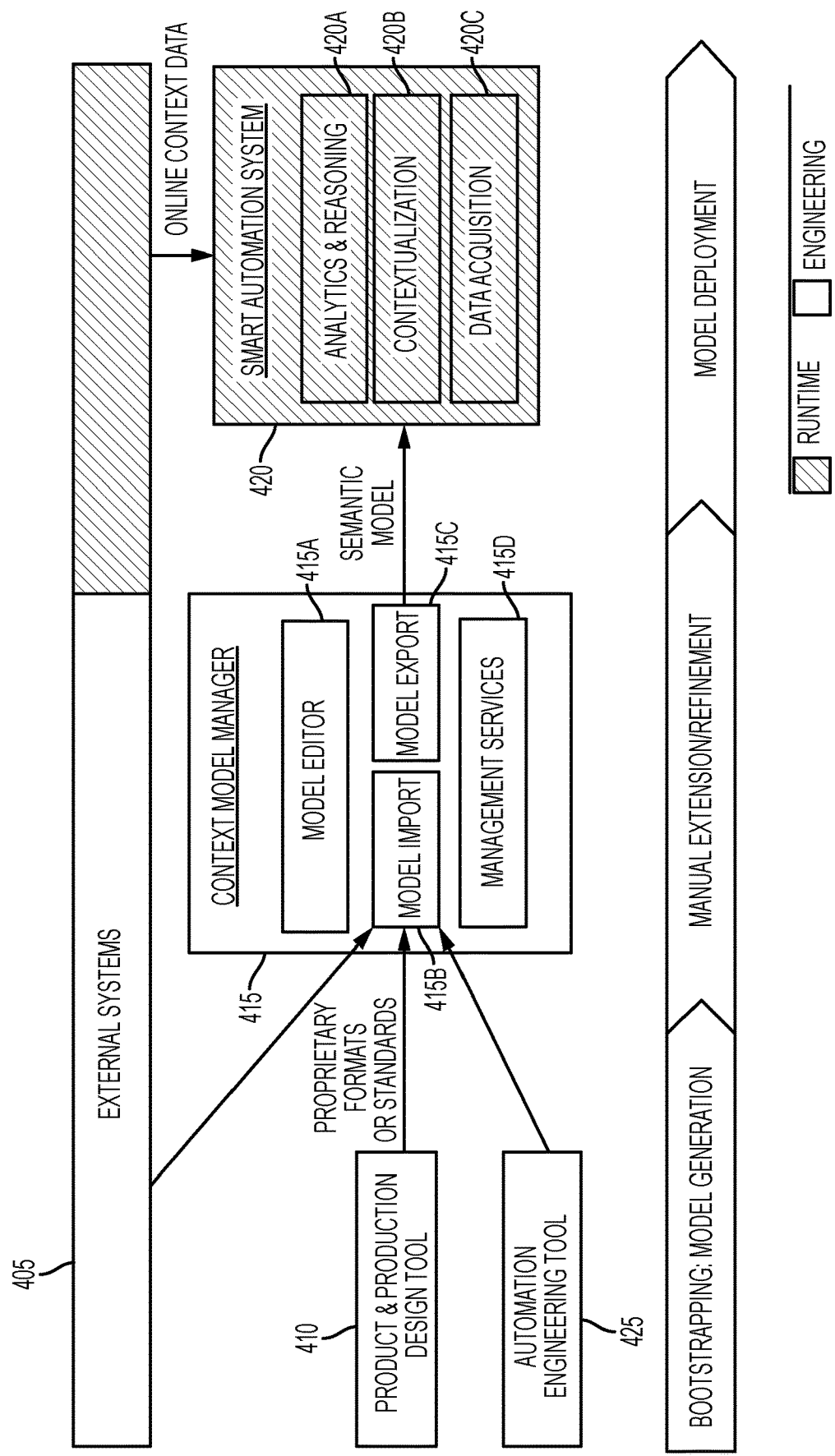
FIG. 4 provides an architecture diagram which illustrates how contextual information is generated and utilized within the automation system, according to some embodiments.

FIG. 4 provides an architecture diagram which illustrates how contextual information is generated and utilized within the automation system, according to some embodiments. A Context Model Manager 415 collects context knowledge from existing engineering and runtime systems (e.g., product lifecycle management, enterprise resource planning, supply chain management, MES, etc.). In the example of FIG. 4, these systems are represented by External Systems 405, a Product and Production Design Tool 410, and an Automation Engineering Tool 425. A Model Import Component 415B in the Context Model Manager 415 is responsible for collecting the various models and translating the models into a common semantic language (e.g., OPC/RDF OWL/RDF). In some embodiments, the translation process is automatic. In other embodiments, the model import process can be manually extended by the user via a Model Editor Component 415A. The Model Editor Component 415A may be provided, for example, in the form of a graphical user interface which provides the user with a visualization of the various context knowledge and allows editing (e.g., via text manipulation and/or using drag-and-drop actions). A Management Services Component 415D within the Context Model Manager 415 generates a semantic model from the received context knowledge. In some embodiments, the Management Services Component 415D performs services such as formal and semantic alignment of the context knowledge, as well as versioning and consistency checking of the produced semantic model. Additionally, in some embodiments, the Management Services Component 415D performs simulation of various automation activity to ensure model capability with the automation system component.

The Context Model Manager 415 may be implemented on any computer system connected directly or indirectly to the automation system. For example, in some embodiments, the Context Model Manager 415 is implemented on an engineer's computer such that the engineer can guide the model creation process. The engineer's computer may be, for example, a desktop computer at a site remote to the automation system or a portable computer (e.g., tablet) used by the engineer locally at the automation system. In other embodiments, the Context Model Manager 415 is implemented on a component of the automation system (e.g., the TIA, the MES, etc.). Within the Context Model Manager 415, the Model Import Component 415B and the Model Export Component 415C may use any technique known in the art for communicating with other devices. Additionally, these components 415B and 415C may support various communication protocols to provide the ability to communicate with a heterogeneous group of external devices and systems.

Once the semantic model the Model Management Computer 415 completes generation of the semantic model, a Model Export Component 415C deploys the model to a Smart Automation System 420. This Smart Automation System 420 may be any component of the automation system with functionality for acquiring, contextualizing, and analyzing automation system data. In the example of FIG. 4, the Smart Automation System 420 includes an Analyzing and Reasoning Component 420A, a Contextualization Component 420B, and a Data Acquisition Component 420C for performing this functionality. In some embodiments, the Smart Automation System 420 is an Intelligent PLC (see, e.g., FIG. 2). In other embodiments, the functionality may be embodied in a field device. The Data Acquisition Component 420C in the Smart Automation System 420 dynamically collects context information from external systems (such as environmental information or other smart automation systems) with the purpose of enriching the locally acquired data during runtime using the semantic model received from the Model Management Computer 415. For example, an environmental sensor (e.g., temperature sensor) may be connected the Smart Automation System 420 and the semantic model may be used to integrate the information provided by the sensor into the overall knowledge of the automation environment.

Figure 5:
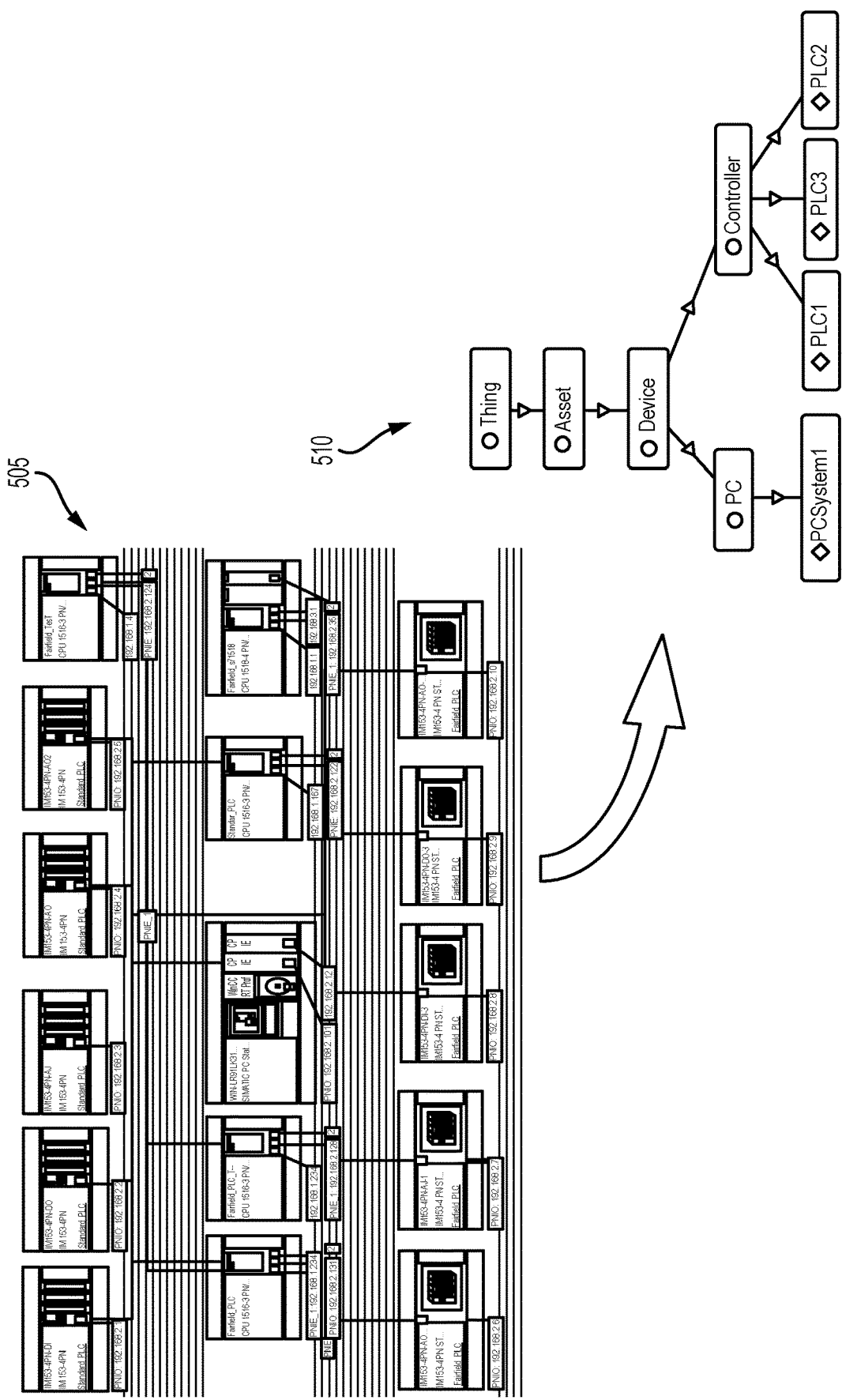
FIG. 5 shows the hardware topology of a graphical engineering development environment project, as may be utilized in some embodiments.

As an example, a common plant metadata model unifying the semantic heterogeneity of an automation system would be the natural source of context information for populating the asset, process, and material models. Until a comprehensive common plant model is available, relevant knowledge sources for generating the asset model are product lifecycle management (PLM), manufacturing execution systems (MES) and the TIA Portal, e.g., following the standard for equipment models IEC 62264-1. As an example, FIG. 5 shows the hardware topology of a TIA project 505 comprising information about devices, their configurations, network connections, I/O modules, etc. By resolving I/O and network addresses, this information is directly available and can be represented in the asset context model 510.

The TIA Portal TIA Portal provides less information regarding explicit process and product. Process context knowledge can be obtained from PLM and MES (e.g., based on IEC 62264-1) or from simulation models (e.g., Simulink, Modelica). Also ongoing standardization activities such as AutomationML can be used as a starting point for acquiring knowledge about the manufacturing process and attaching rich context information to automation data.

As another example, consider the generation of a control model. As the design and deployment of a controller goes through several stages, there is already a wide range of information about the control system and controller implementation available. Generally, there are three stages of realization. The first stage is development by the control engineer using modeling and simulation tools such as Mathlab Simulink, Siemens LMS, Modelica, etc. At this stage, a complex dynamical model of the controller and the controlled system are developed, on which the controller is designed, tested, and optimized. The second stage is the specific design and implementation for the PLCs, for example, using programming standards like IEC 61131-3 and the TIA Portal. Finally, the third stage is compilation and deployment of the controller code on the PLC. Today, all symbolic information from stages 1 and 2 is not transferred to stage 3 because this information not needed for execution of the control program. For example, knowledge about the performance goals of a controller or the physical dependencies that affect different controllers is not available on the PLC. However, to enable online monitoring and optimization of the controller behavior retaining this context information is necessary. Thus, the challenge is to capture relevant information of the first two stages and formalize it using the control context model.

Figure 6A:
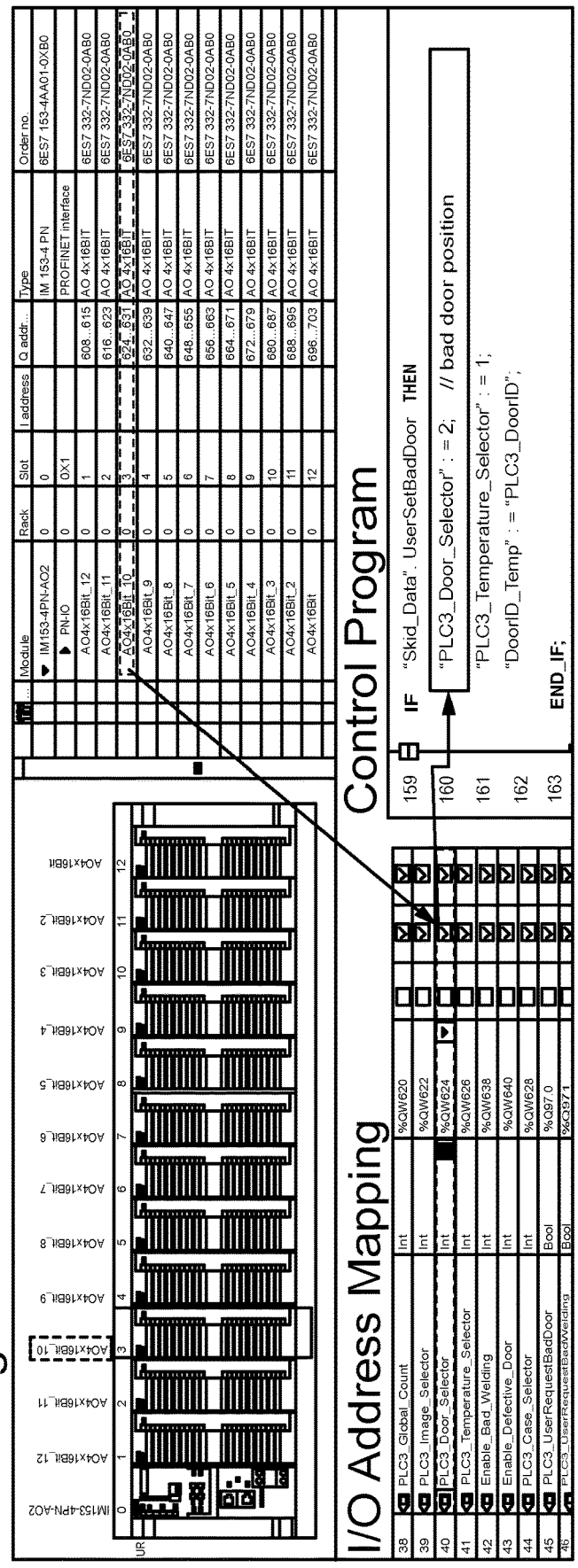
FIG. 6A shows the extract relation between memory addresses and control program variables, as it may be utilized in some embodiments.

As a first step, we focus on the stage 2 which contains information directly related to the implemented control function. We leverage this direct relation by mapping the I/O and process image addresses to device configurations and symbolic variable names used in the control program. FIG. 6A shows the extract relation between memory addresses and control program variables, as it may be utilized in some embodiments.

Figure 6B:
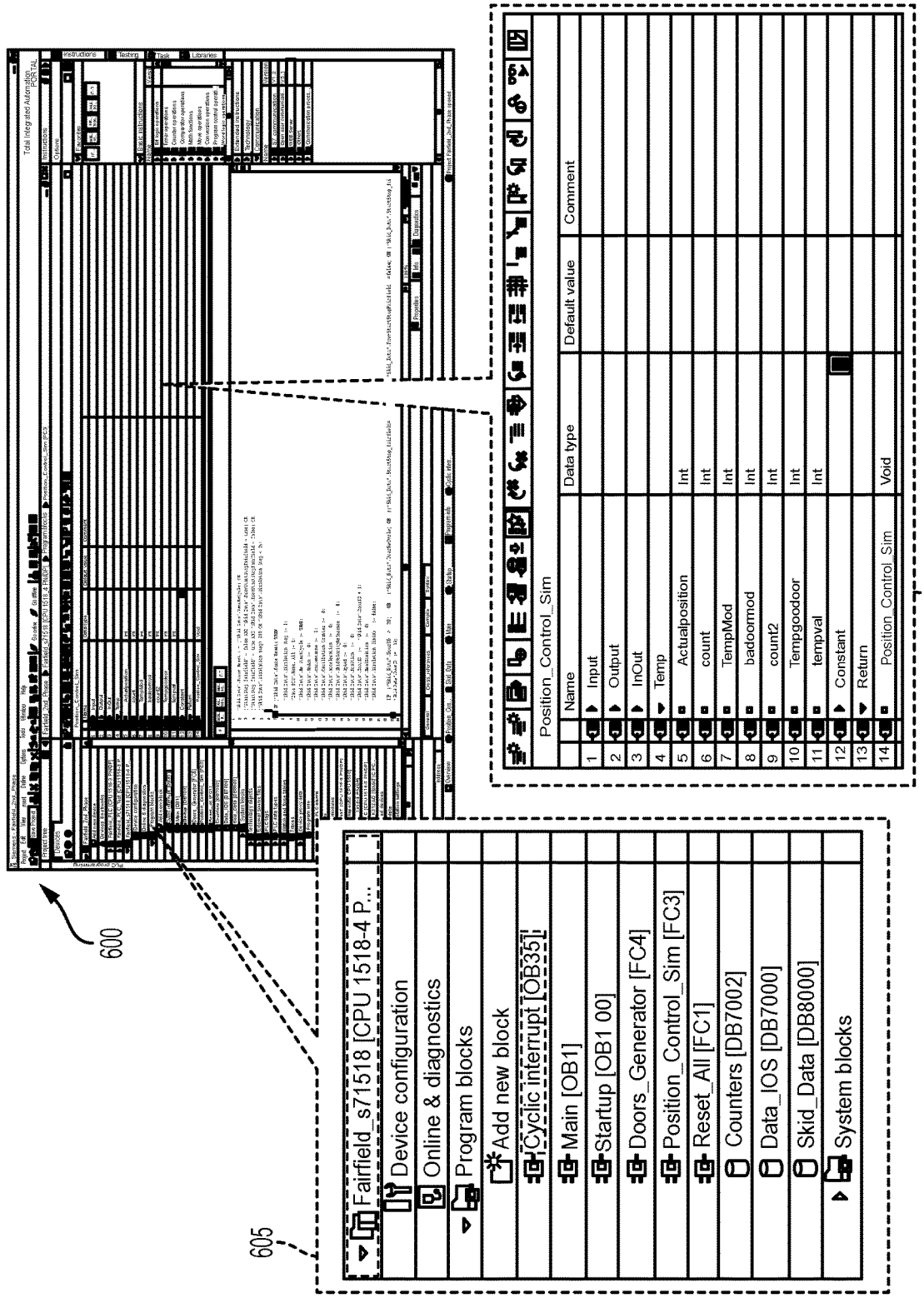
FIG. 6B shows an example graphical engineering development environment where all this information is available.

Based on the understanding of how process image data map to logical names and consequently control program code, direct relations between variables can be extracted based on the program code (e.g., specified in SCL, Ladder Logic, etc.). For example, the following may be examples of elements of interest: the structure and organization of the program blocks; the relationship between the program blocks (e.g., inputs/outputs, etc.); the control flow of the program blocks (e.g., timer-based cyclic execution); the parameters of the program blocks (e.g., temporary and global variables, etc.); the language constructs within a program block (e.g., LOOP, comments, etc.); and the dependencies between the variables within the entire control program. FIG. 6B shows an example graphical engineering development environment 600 where all this information is available. Callout 605 shows the portion of the graphical engineering development environment 600 which includes information on program blocks, while Callout 610 highlights the portion of the graphical engineering development environment 600 which includes process variable information.

Figure 6C:
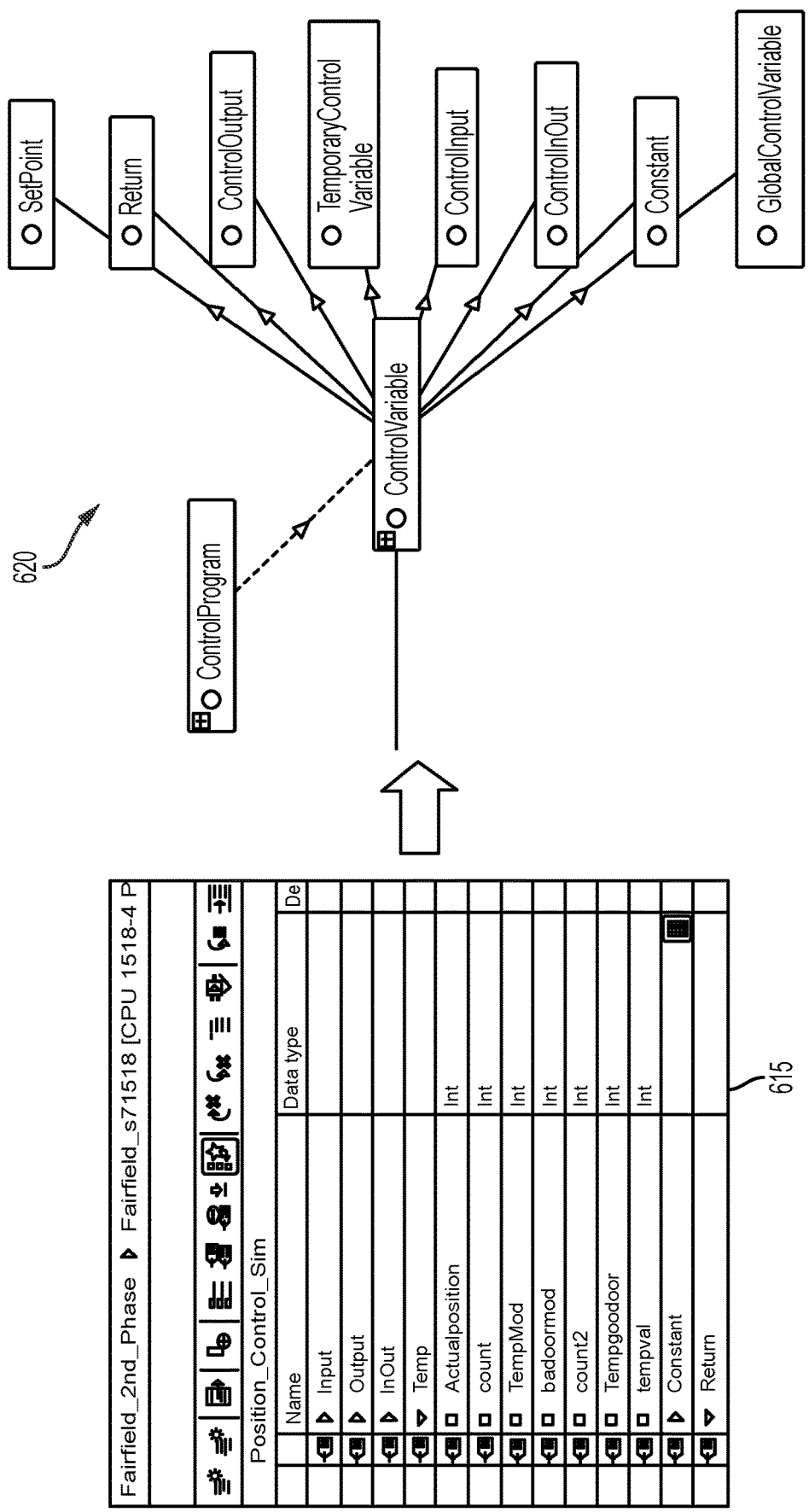
FIG. 6C shows a graphical engineering development environment project which provides a set of control variables as the basis of the control context ontology, as may be utilized in some embodiments.
Figure 6D:
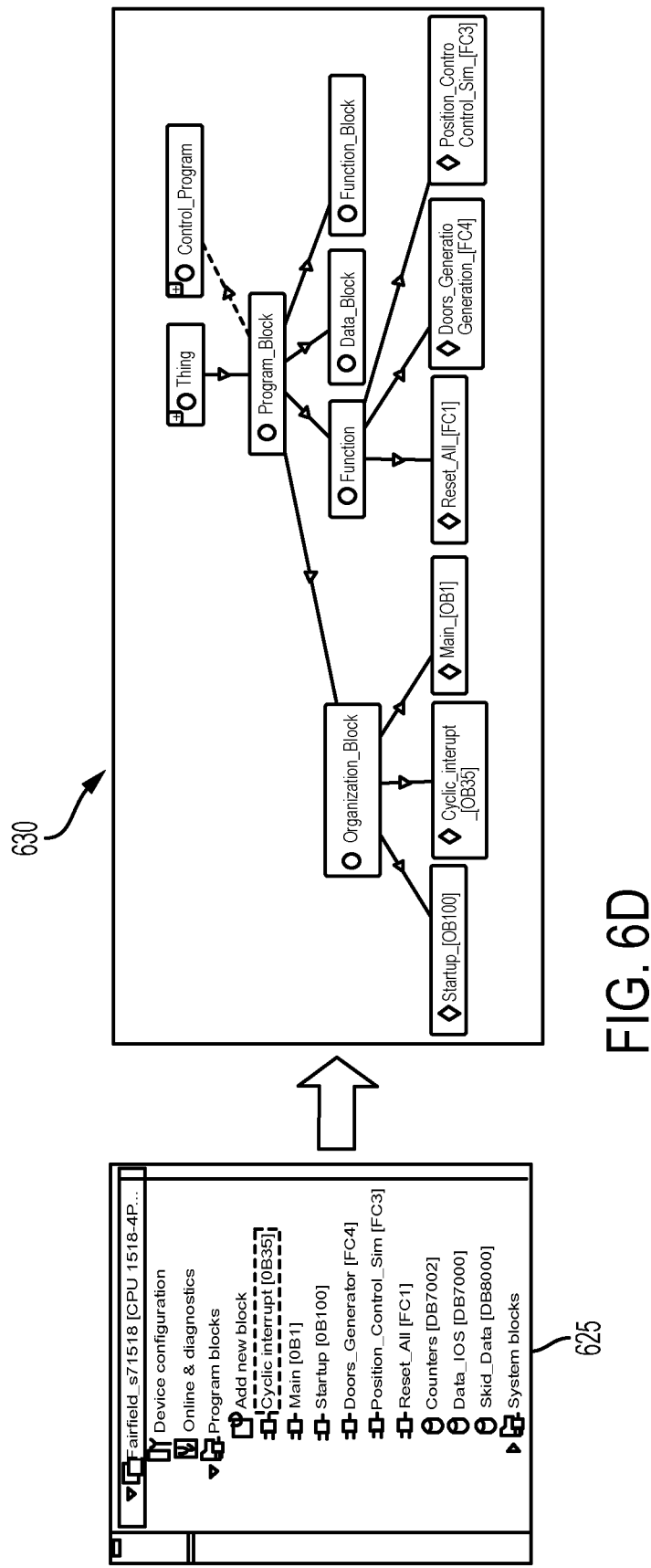
FIG. 6D shows control functions in a portion graphical engineering tool extracted to populate a control context ontology as may be utilized in some embodiments.

FIG. 6C shows how fragments of the control context models described above with respect to FIGS. 6A and 6B can be instantiated by using the control variables of the control program. More specifically, FIG. 6C shows a TIA project 615 which provides a set of control variables as the basis of the control context ontology 620. In addition to the control variables, the control program also contains control functions. FIG. 6D shows control functions in a portion graphical engineering tool 625 extracted to populate a control context ontology 630. In this example, the ontology includes information about the positioning control program for a body shop door assembly process including the following control functions: Startup [OB100], Reset_All [FC1], Doors_Generator [FC4], Position_Control_Sim [FC3], Main [OB1], etc.

Figure 6E:
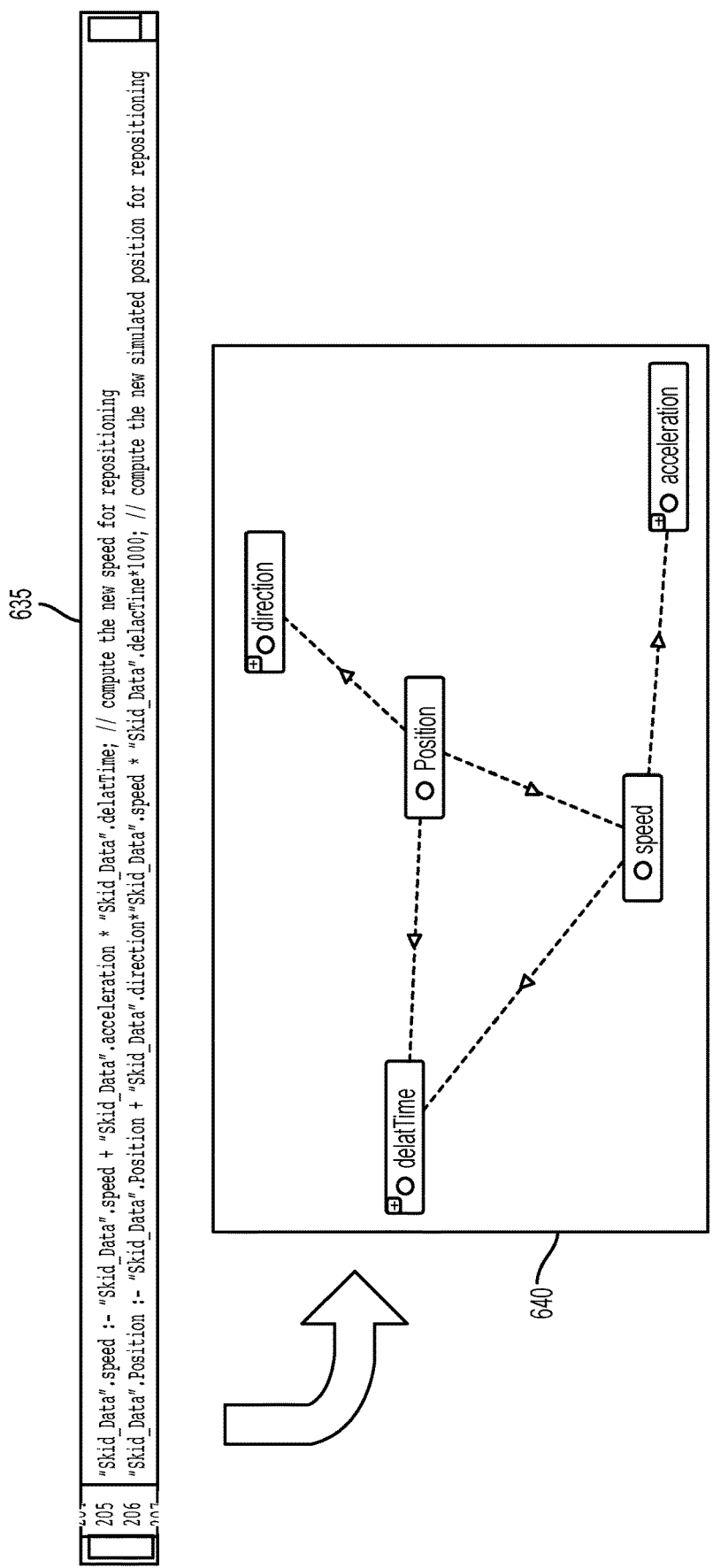
FIG. 6E shows a code snippet with an assignment command which may be used in some embodiments to extract a dependency relation between various variables used in an automation process.

By further analyzing the program language constructs (in particular conditions, comparisons and assignments) further dependences between the control variables can be derived and represented formally by means of the explicit relations in the control context model. For example, in FIG. 6E, the assignment command shown in code snippet 635 allows extracting a dependency relation between the control variables speed, acceleration and delatTime as well as between position, direction, speed and delatTime. This dependency relation is depicted in the ontology 640. In this case, the time causality is very simple since it is explicitly given by the sequence of logic control statements. In the case of a closed loop control (e.g., PID) the causal relationship is slightly more complicated because the value of a certain variable is not only dependent on the simultaneous values of other variables but also on the past values of itself and on other variables.

The control context model describes that control variables directly influence the performance of the control system and therefore also the control Key Performance Indicators (KPIs). The types of KPIs that are relevant for a certain application are defined by the type of control system and in many cases can be automatically derived from the context and added to the control context (e.g., in a state-discrete control system programmed with ladder logic, all timing information can be considered as an important KPI). Connecting alarms (represented by the event context model) with control KPIs and additional control context information is extremely valuable for alarm management and diagnostics. By traversing the context graph, root causes for alarms can be discovered and explained.

The processors described herein as used by control layer devices may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

Various devices described herein including, without limitation to the control layer devices and related computing infrastructure, may include at least one computer readable medium or memory for holding instructions programmed according to embodiments of the invention and for containing data structures, tables, records, or other data described herein. The term "computer readable medium" as used herein refers to any medium that participates in providing instructions to one or more processors for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks. Non-limiting examples of volatile media include dynamic memory. Non-limiting examples of transmission media include coaxial cables, copper wire, and fiber optics, including the wires that make up a system bus. Transmission media may also take the form of acoustic or light waves, such as those generated during radio wave and infrared data communications.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically, wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

We claim:

1. A system comprising:
a context model manager computer configured to generate a semantic context model representative of an automation system, the context model manager computer comprising:
   a model import component configured to import automation system knowledge from an automation engineering system and an automation runtime system, wherein the automation system knowledge from the automation engineering system is imported from an automation engineering tool, and wherein the automation system knowledge is provided in a plurality of distinct context models;
   a management services component configured to:
      identify conceptual entities associated with the automation system based on the automation system knowledge, and
      generate the semantic context model comprising a plurality of ontologies providing formal specifications of the conceptual entities associated with the automation system, by formally and semantically aligning the plurality of distinct context models to yield the semantic context model, and automatically translating the plurality of distinct context models into a common semantic language; and
   a model export component configured to deploy the semantic context model to one or more intelligent programmable logic controllers (PLCs) in the automation system.

2. The system of claim 1, wherein the plurality of ontologies comprises an asset ontology comprising plant topology information associated with the automation system.

3. The system of claim 1, wherein the plurality of ontologies comprises a process ontology comprising information associated with resource flow through the production process.

4. The system of claim 1, wherein the plurality of ontologies comprises a product ontology comprising information associated with a product produced by the production process.

5. The system of claim 1, wherein the plurality of ontologies comprises an event ontology comprising information associated with events related to operation of the automation system.

6. The system of claim 5, wherein the event ontology comprises information related to scheduled downtime of one or more components of the automation system.

7. The system of claim 1, wherein the plurality of ontologies comprises a control logic ontology comprising information associated with program logic executed by control layer devices within the automation system.

8. The system of claim 1, wherein the plurality of ontologies comprises an environmental ontology providing a formal specification of entities producing environmental data, wherein the entities comprise one or more environmental data sources external to the automation system.

9. The system of claim 8, wherein one or more environmental data sources external to the automation system comprise one or more remote web servers.

10. The system of claim 1, wherein the context model manager computer further comprises:
a model editor component configured to receive one or more user modifications to the semantic context model;
wherein, the management services component is configured to modify the semantic context model based on the one or more user modifications.

11. The system of claim 1, wherein the model editor component is configured to:
present a graphical user interface configured to:
   display the semantic context model, and
   receive the one or more user modifications to the semantic context model.

12. The system of claim 1, further comprising:
an intelligent programmable logic controller comprising:
   one or more processors configured to execute according to a scan cycle;
   a volatile computer-readable storage medium comprising a process image area storing automation system data;
   a non-volatile computer-readable storage medium; and
   a plurality of controller components executed by the one or more processors according to the scan cycle, the plurality of controller components comprising:
      a data connector component with a deployment interface configured to receive the semantic context model,
      a contextualization component configured to create one or more semantic annotations for the automation system data using the semantic context model, and
      a historian component configured to store, in a non-volatile storage medium included in the intelligent programmable logic controller, the one or more semantic annotations and the automation system data.

13. The system of claim 12, wherein the plurality of controller components further comprises:
a data analytics component configured to apply one or more analytical models to the one or more semantic annotations and the automation system data to determine contextual information associated with automation events.

* * * * *